United States Patent
Ladany

[15] 3,651,721
[45] Mar. 28, 1972

[54] TURNING APPARATUS

[72] Inventor: Shaul Ladany, 71 Rechov Aluf David, Ramat Gan, Israel

[22] Filed: May 15, 1970

[21] Appl. No.: 37,816

[52] U.S. Cl. ................................82/1 C, 82/1 R, 29/96
[51] Int. Cl. ...........................................B23b 1/00
[58] Field of Search ..............82/1, 1 C; 29/102, 103, 105, 29/96; 408/133

[56] References Cited

UNITED STATES PATENTS 2,383,958    9/1945    De Vlieg ..........................408/133 X

FOREIGN PATENTS OR APPLICATIONS 607,770    9/1948    Great Britain ...........................29/102

Primary Examiner—Leonidas Vlachos
Attorney—Benjamin J. Barish

[57] ABSTRACT

Turning apparatus comprises a turning tool having a helical cutting edge and a holder therefor to hold the tool fixed with a segment of its helical cutting edge in engagement with the workpiece as the latter is rotated, the tool holder enabling the tool to be rotated a predetermined amount, when the engaged segment of its helical cutting edge has been worn, to advance a fresh segment into engagement with the workpiece.

6 Claims, 5 Drawing Figures

SHAUL LADANY
Inventor

By Benjamin J. Barish
ATTORNEY

TURNING APPARATUS

BACKGROUND OF THE INVENTION

The present invention relates to turning apparatus and to methods of operating same.

In the known turning apparatus, such as lathes, the turning tool must frequently be sharpened as its cutting edge becomes worn, which is of course costly and time-consuming.

SUMMARY OF THE PRESENT INVENTION

According to the present invention there is provided turning apparatus comprising a workpiece holder, a rotary drive therefor, a turning tool having a helical cutting edge, and a tool holder fixedly holding the turning tool with the longitudinal axis of the tool at an acute angle to the longitudinal axis of the workpiece and with a segment of the tool helical cutting edge in engagement with the workpiece as the latter is rotated. The tool holder further includes means enabling the tool to be rotated a predetermined amount, when the engaged segment of its helical edge has been worn, to advance a fresh segment of its helical cutting edge into engagement with the workpiece.

It is thus seen that the present invention obviates the need to frequently resharpen the turning tool since whenever the cutting edge has been worn, a fresh cutting edge may be advanced to the cutting position by merely rotating the tool slightly. When the whole tool has thus been worn, the complete helical cutting edge may be resharpened, or in some case it may be preferable to merely discard the whole tool.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENT

Figure 1:
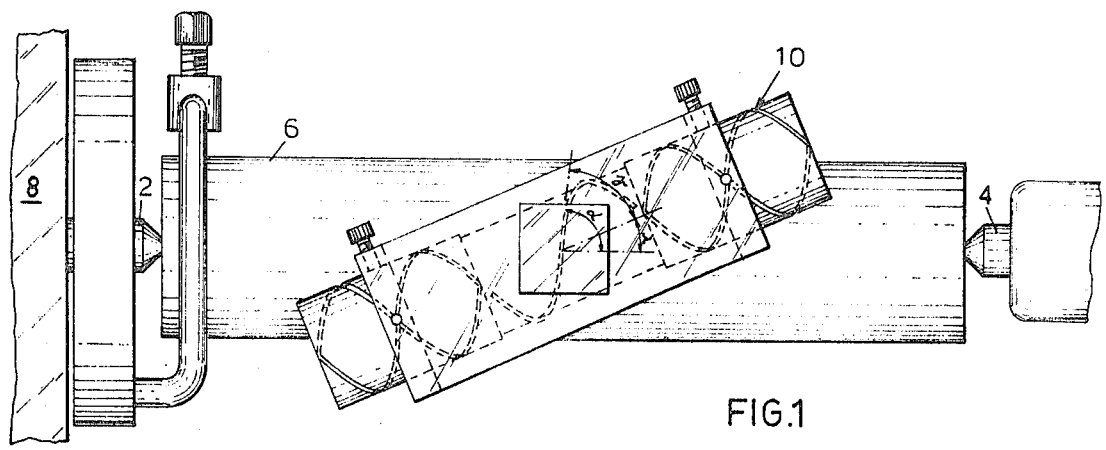
FIG. 1 is a side elevational view of a part of a turning apparatus constructed in accordance with the present invention.

The apparatus illustrated in the drawings comprises a standard lathe including a headstock 2 and a tailstock 4 for holding the workpiece 6, the latter being rotated by a drive 8.

Figures 2, 4:
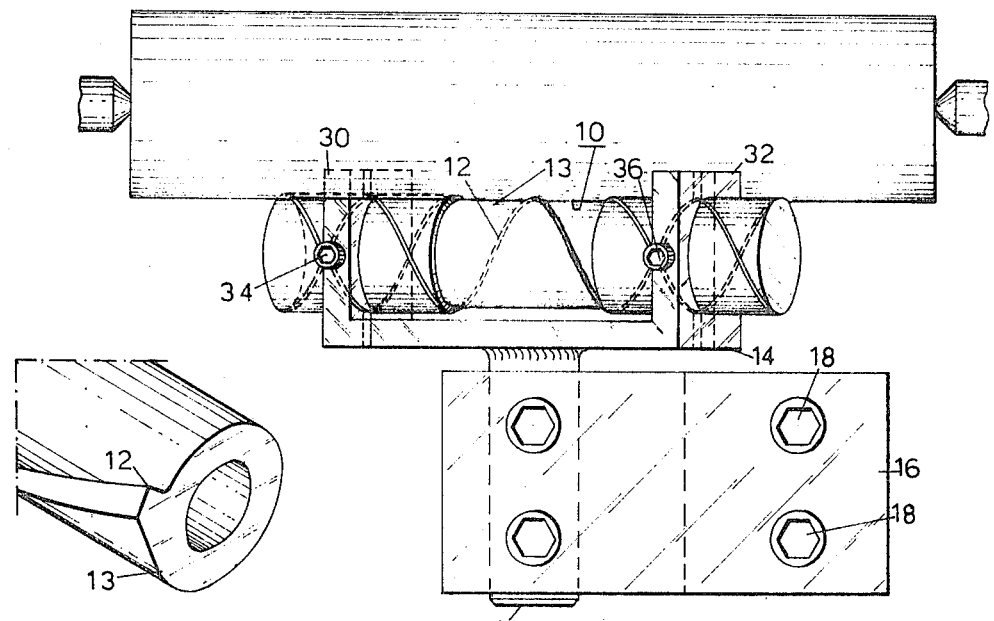
FIG. 2 is a top plan view of the apparatus of FIG. 1.
FIG. 4 is a longitudinal sectional view of the turning tool of FIG. 3.
Figure 3:
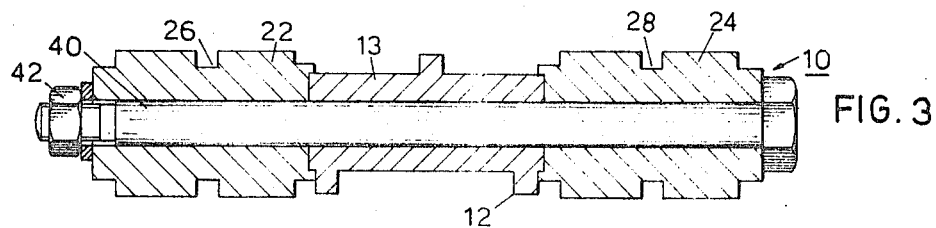
FIG. 3 is a partial perspective view of the turning tool used in the apparatus of FIG. 1.

In accordance with the present invention, the turning tool 10 is one having a helical cutting edge 12 adapted to engage the workpiece 6. The cutting edge 12 projects from the shank 13 of the tool and may be of rectangular section with sharp outer edges (FIGS. 3 and 4); alternatively it may be of triangular section, the cutting edge being the apex. The whole tool (i.e. including the shank) may be made of cutting steel, or only the helical cutting edge, as known per se. It is even contemplated that a drill bit, screw or bolt of conventional construction but having a long pitch may be used as the cutting tool.

The turning tool 10 is held in position by a tool holder 14 which is secured to the bed or other fixed part of the lathe by means of a clamping plate 16. During operation of the turning apparatus, tool holder 14 supports the turning tool 10 so that the longitudinal axis of the tool 10 is at an acute angle ($\lambda$) to the longitudinal axis of the workpiece 6. The segment of the cutting edge 12 in engagement with the workpiece is also at an acute angle ($\alpha$) to the longitudinal axis of the workpiece, the latter angle depending upon the angle ($\gamma$) the helix forms with its own longitudinal axis. For purposes of example, angle $\lambda$ may be 23°, angle $\gamma$ may be 27°, and angle $\alpha$ may be 50°.

For purposes of adjusting the angle of the cutting tool 10, and particularly its cutting edge 12, with respect to the workpiece, clamping plate 16 may carry a plurality of threaded fasteners 18 adapted to engage handle 20 of the tool holder 14. Fasteners 18 are released to permit the tool holder to be rotated for adjusting the position of the tool with respect to the workpiece, and then retightened for securely clamping the tool holder in position.

During operation of the apparatus, only a small segment of the cutting edge 12 is in engagement with the workpiece as the latter is rotated. When this small segment is worn, it is only necessary to slightly rotate cutting tool 10 for purposes of bringing a fresh segment of the helical cutting edge 12 into engagement with the workpiece.

For purposes of bringing the fresh segment of the cutting edge into cutting position, cutting tool 10 is provided with a pair of guide parts 22 and 24 (FIG. 4) each disposed laterally of the helical cutting edge part 12. Each guide part is formed with one (or two) helical recesses, 26 and 28 respectively, corresponding to the helix of the cutting edge 12. Tool holder 14 includes a pair of arms 30 and 32 receiving the guide parts 22 and 24 of the cutting tool. Each arm carries a threaded pin 34 and 36 adapted to seat within recesses 26 and 28 respectively. When the turning tool 10 is rotated slightly, in order to bring a fresh cutting segment of its cutting edge 12 into position, pins 34 and 36 will ride within recesses 26 and 28 and will assure that the fresh cutting segment will be exactly in the required cutting position with respect to the workpiece. Tool 10 may be rotated during this operation by hand, or by a wrench (not shown) adapted to engage an end of the cutting tool, and after the fresh segment has been advanced into cutting position, threaded pins 34 and 36 may be threaded down tightly to clamp the tool in this position. Alternatively, there may be provided a separate pair of threaded pins or screws for fixing the tool in position within the holder.

While the guide parts 22 and 24 may be made integrally with the cutting edge part 12 of the cutting tool, it is preferred that these parts be made separately and clamped together, as by means of a long bolt 40 passing through a bore in all three parts and clamped at one end by a nut 42. In this manner, when the cutting edge part 12 of the tool is completely worn out, it may be replaced by another cutting part while retaining the original guiding parts 22 and 24.

Figure 5:
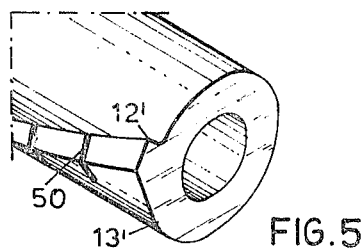
FIG. 5 is a partial perspective view illustrating a modification of the turning tool of FIG. 3.

FIG. 5 shows a variation, in which the helical cutting edge 12′, projecting from the shank 13′ of the cutting tool is formed with a radial notch 50 terminating short of the shank, for dividing the helical cutting edge into distinct cutting segments.

Many other variations, modifications and applications of the illustrated embodiment will be apparent.

I claim:

1. Turning apparatus comprising a workpiece holder, a rotary drive therefor, a turning tool having a helical cutting edge, and a tool holder fixedly holding said turning tool with the longitudinal axis of the tool at an acute angle to the longitudinal axis of the workpiece and with a segment of the tool helical cutting edge in engagement with the workpiece as the latter is rotated, said tool holder including means enabling the tool to be rotated a predetermined amount, when said engaged segment of its helical cutting edge has been worn, to advance a fresh segment of its helical cutting edge into engagement with the workpiece.

2. Apparatus as defined in claim 1, wherein said cutting tool includes a guide part cooperable with the tool holder for enabling a new segment of the helical cutting edge to be advanced into engagement with the workpiece.

3. Apparatus as defined in claim 2, wherein said guide part is disposed laterally of the helical cutting edge and is formed with a helical recess corresponding to the helix of said helical cutting edge, said tool holder including a pin seated in said recess and movable therein during the advance of a fresh segment of said helical cutting edge.

4. Apparatus as defined in claim 3, wherein said cutting tool includes two guide parts, one on each side of said helical cutting edge, and said tool holder includes a pin seated in the recess of each of said guide parts.

5. Apparatus as defined in claim 1, wherein said helical cutting edge is formed with radial notches dividing same into distinct cutting segments.

6. A method of operating turning apparatus comprising a workpiece holder, a rotary drive therefor, a turning tool having a helical cutting edge, and a tool holder fixedly holding said turning tool with the longitudinal axis of the tool at an acute angle to the longitudinal axis of the workpiece and with a segment of the tool helical cutting edge in engagement with the workpiece as the latter is rotated, said tool holder including means enabling the tool to be rotated a predetermined amount, when said engaged segment of its helical cutting edge has been worn, to advance a fresh segment of its helical cutting edge into engagement with the workpiece, said method comprising, fixedly holding said turning tool with its longitudinal axis at an acute angle to the longitudinal axis of the workpiece and with a segment of its helical cutting edge in cutting engagement with the workpiece as the workpiece is rotated, and when the said engaged segment of the helical cutting edge has been worn, rotating the turning tool a predetermined amount to advance a fresh segment of the helical cutting edge into engagement with the workpiece.

* * * * *